US008606583B2

(12) United States Patent
Kondo et al.

(10) Patent No.: US 8,606,583 B2
(45) Date of Patent: Dec. 10, 2013

(54) SPEECH SYNTHESIS SYSTEM FOR GENERATING SPEECH INFORMATION OBTAINED BY CONVERTING TEXT INTO SPEECH

(75) Inventors: Reishi Kondo, Tokyo (JP); Masanori Kato, Tokyo (JP); Yasuyuki Mitsui, Tokyo (JP)

(73) Assignee: NEC Corporation, Tokyo (JP)

( * ) Notice: Subject to any disclaimer, the term of this patent is extended or adjusted under 35 U.S.C. 154(b) by 451 days.

(21) Appl. No.: 13/000,342

(22) PCT Filed: Jun. 22, 2009

(86) PCT No.: PCT/JP2009/002816
§ 371 (c)(1),
(2), (4) Date: Dec. 20, 2010

(87) PCT Pub. No.: WO2010/018649
PCT Pub. Date: Feb. 18, 2010

(65) Prior Publication Data
US 2011/0106538 A1 May 5, 2011

(30) Foreign Application Priority Data
Aug. 13, 2008 (JP) ................................. 2008-208291

(51) Int. Cl.
*G10L 13/08* (2013.01)
(52) U.S. Cl.
USPC ........................................................ 704/260
(58) Field of Classification Search
USPC ........................................................ 704/260
See application file for complete search history.

(56) References Cited

U.S. PATENT DOCUMENTS

| 6,601,029 B1* | 7/2003 | Pickering ...................... 704/257 |
| 6,970,935 B1* | 11/2005 | Maes ............................ 709/230 |
| 7,099,826 B2* | 8/2006 | Akabane et al. ............... 704/260 |
| 7,203,648 B1* | 4/2007 | Ostermann et al. ........... 704/260 |

(Continued)

FOREIGN PATENT DOCUMENTS

| JP | 3240691 B | 12/2001 |
| JP | 3344487 B | 11/2002 |

(Continued)

OTHER PUBLICATIONS

International Search Report for PCT/JP2009/002816 mailed Jul. 21, 2009.

*Primary Examiner* — Michael N Opsasnick

(57) ABSTRACT

This speech synthesis system includes a server device and a client device. The client device accepts text information representing text, and transmits a speech element request to the server device. The server device stores speech element information. The server device receives the speech element request transmitted by the client device and, in response to the received speech element request, transmits speech element information to the client device so that the speech element information is received by the client device in a different order from an order of arrangement of speech elements in speech corresponding to the text. The client device executes a speech synthesis process by rearranging the speech element information so that speech elements represented by the received speech element information are arranged in the same order as the order of arrangement of the speech elements in the speech corresponding to the text.

19 Claims, 10 Drawing Sheets

(56) References Cited

U.S. PATENT DOCUMENTS

| | | | |
|---|---|---|---|
| 7,523,036 B2* | 4/2009 | Akabane et al. | 704/260 |
| 2002/0107918 A1* | 8/2002 | Shaffer et al. | 709/203 |
| 2003/0161298 A1* | 8/2003 | Bergman et al. | 370/352 |
| 2004/0122668 A1* | 6/2004 | Marino et al. | 704/249 |
| 2006/0074688 A1* | 4/2006 | Cosatto et al. | 704/275 |
| 2007/0112570 A1* | 5/2007 | Kaneyasu | 704/260 |

FOREIGN PATENT DOCUMENTS

| | | |
|---|---|---|
| JP | 3379643 B | 2/2003 |
| JP | 2003233386 A | 8/2003 |
| JP | 3518340 B | 4/2004 |
| JP | 2004185074 A | 7/2004 |
| JP | 2006322962 A | 11/2006 |
| WO | 2007141993 A | 12/2007 |

* cited by examiner

Fig.2

| SPEECH ELEMENT SPECIFICATION INFORMATION | | | | SPEECH ELEMENT IDENTIFICATION INFORMATION |
|---|---|---|---|---|
| PHONEME | CENTRAL PITCH | TEMPORAL LENGTH | ... | |
| a | 200Hz | 30msec | ... | 3 |
| a | 180Hz | 25msec | ... | 25 |
| ka | 190Hz | 35msec | ... | 43 |
| ka | 240Hz | 28msec | ... | 7 |
| ... | ... | ... | ... | ... |

| BEFORE-<br>REARRANGEMENT<br>ORDER INFORMATION | SPEECH ELEMENT<br>IDENTIFICATION<br>INFORMATION | RANDOM<br>NUMBER<br>VALUE |
|---|---|---|
| 1 | 152 | |
| 2 | 31 | |
| 3 | 72 | |
| 4 | 28 | |
| 5 | 198 | |
| ⋮ | ⋮ | ⋮ |

(B)

| BEFORE-<br>REARRANGEMENT<br>ORDER INFORMATION | SPEECH ELEMENT<br>IDENTIFICATION<br>INFORMATION | RANDOM<br>NUMBER<br>VALUE |
|---|---|---|
| 1 | 152 | 24 |
| 2 | 31 | 591 |
| 3 | 72 | 412 |
| 4 | 28 | 138 |
| 5 | 198 | 78 |
| ⋮ | ⋮ | ⋮ |

(C)

| BEFORE-<br>REARRANGEMENT<br>ORDER INFORMATION | SPEECH ELEMENT<br>IDENTIFICATION<br>INFORMATION | RANDOM<br>NUMBER<br>VALUE |
|---|---|---|
| 1 | 152 | 24 |
| 15 | 62 | 38 |
| 8 | 8 | 59 |
| 5 | 198 | 78 |
| 26 | 332 | 102 |
| ⋮ | ⋮ | ⋮ |

Fig.4

| SPEECH ELEMENT IDENTIFICATION INFORMATION | SPEECH ELEMENT INFORMATION |
|---|---|
| 1 | |
| 2 | |
| 3 | |
| 4 | |
| 5 | |
| 6 | |
| ⋮ | ⋮ |

| BEFORE-REARRANGEMENT ORDER INFORMATION | RANDOM NUMBER VALUE |
|---|---|
| 1 | 24 |
| 2 | 591 |
| 3 | 412 |
| 4 | 138 |
| 5 | 78 |
| ⋮ | ⋮ |

(B)

| BEFORE-REARRANGEMENT ORDER INFORMATION | RANDOM NUMBER VALUE |
|---|---|
| 1 | 24 |
| 15 | 38 |
| 8 | 59 |
| 5 | 78 |
| 26 | 102 |
| ⋮ | ⋮ |

SPEECH SYNTHESIS SYSTEM FOR GENERATING SPEECH INFORMATION OBTAINED BY CONVERTING TEXT INTO SPEECH

The present invention is the National Phase of PCT/JP2009/002816, filed Jun. 22, 2009, which enjoys the benefit of priority from Japanese patent application No. 2008-208291, filed on Aug. 13, 2008, the disclosure of which is incorporated in this specification in its entirety.

TECHNICAL FIELD

The present invention relates to a speech synthesis system that executes a speech synthesis process by communication between a server device and a client device.

BACKGROUND ART

There is a known speech synthesis system that includes a server device configured to store speech element information representing respective speech elements included in speech uttered by a user (a speech registering user) and a client device configured to generate speech information obtained by converting text into speech based on text information representing the text (i.e., execute a speech synthesis process) JP2003-23386.

This client device generates speech element specification information (for example, information representing a phoneme and a prosody) that specifies a speech element based on inputted text information. Then, the client device transmits the generated speech element specification information to the server device.

The server device previously stores speech element information and speech element specification information in association with each other. The server device transmits speech element information stored in association with the speech element specification information received from the client device, to the client device. Then, the client device executes a speech synthesis process based on the speech element information received from the server device.

According to this speech synthesis system, the client device does not need to store speech element information, and it is therefore possible to ensure a large storage region that can be used by the client device.

In the abovementioned speech synthesis system, the server device transmits speech element information to the client device so that the speech element information is received by the client device in the same order as the order of arrangement of speech elements in speech corresponding to text represented by the text information. Therefore, in a case that part of the text corresponds to part of the speech uttered by the speech registering user, the server device transmits a portion including consecutive speech elements in the speech to the client device in a state that the order of arrangement of the speech elements in the speech is maintained.

Therefore, in such a case, there has been a problem that it is relatively highly possible that information transmitted from the server device to the client device is monitored (fraudulently acquired) by a fraudulent user, and thereby, the portion including the consecutive speech elements in the speech uttered by the speech registering user is acquired by the fraudulent user. If the speech is acquired by the fraudulent user, there is a fear that, for example, in an authentication process by voice (a voice authentication process), the acquired speech is used and the fraudulent user is thereby recognized as the speech registering user.

Accordingly, an object of the present invention is to provide a speech synthesis system capable of solving the aforementioned problem that the portion including the consecutive speech elements in the speech uttered by the speech registering user is acquired by the fraudulent user.

SUMMARY

In order to achieve the abovementioned object, a speech synthesis system of an embodiment of the present invention is a system including a server device and a client device connected so as to be capable of communicating with each other.

Further, the client device includes: a text information accepting unit configured to accept text information representing text; and a speech element requesting unit configured to transmit, to the server device, a speech element request for requesting speech element information representing respective speech elements composing speech corresponding to the text represented by the accepted text information.

Further, the server device includes: a speech element information storing unit configured to store speech element information representing respective speech elements included in speech uttered by a speech registering user; and a speech element information transmitting unit configured to receive the speech element request transmitted by the client device and, in response to the received speech element request, transmit the speech element information to the client device so that the speech element information is received by the client device in a different order from an order of arrangement of the speech elements in the speech corresponding to the text.

Further, the client device includes a speech synthesizing unit configured to receive the speech element information transmitted by the server device, rearrange the received speech element information so that speech elements represented by the received speech element information are arranged in a same order as the order of arrangement of the speech elements in the speech corresponding to the text, and generate speech information obtained by converting the text into speech based on the rearranged speech element information.

Further, a speech synthesis method as another embodiment of the present invention includes: accepting text information representing text, by a client device; transmitting a speech element request for requesting speech element information representing respective speech elements composing speech corresponding to the text represented by the accepted text information, to a server device, by the client device; receiving the speech element request transmitted by the client device and, in response to the received speech element request, transmitting speech element information, which is information stored in a storing device of the server device and is information representing respective speech elements included in speech uttered by a speech registering user, to the client device so that the speech element information is received by the client device in a different order from an order of arrangement of the speech elements in the speech corresponding to the text, by the server device; and receiving the speech element information transmitted by the server device, rearranging the received speech element information so that speech elements represented by the received speech element information are arranged in a same order as the order of arrangement of the speech elements in the speech corresponding to the text, and generating speech information obtained by converting the text into speech based on the rearranged speech element information, by the client device.

Further, a server device as another embodiment of the present invention is a device connected to a client device so as to be capable of communicating therewith.

Further, this server device includes: a speech element information storing unit configured to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text.

Further, a server device program product as another embodiment of the present invention is a server device program product including computer implementable instructions for causing a server device connected to a client device so as to be capable of communicating therewith, to realize: a speech element information storing process unit configured to cause a storing device of the server device to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text.

Further, a client device as another embodiment of the present invention is a device connected to a server device so as to be capable of communicating therewith. Further, this client device includes: a text information accepting unit configured to accept text information represented by text; a speech element requesting unit configured to transmit, to the server device, a speech element request for requesting speech element information representing respective speech elements composing speech corresponding to the text represented by the accepted text information; and a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information.

Further, a client device program product as another embodiment of the present invention is a client device program product including computer implementable instructions for causing a client device connected to a server device so as to be capable of communicating therewith, to realize: a text information accepting unit configured to accept text information representing text; a speech element requesting unit configured to transmit, to the server device, a speech element request for requesting speech element information representing respective speech elements composing speech corresponding to the text represented by the accepted text information; and a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information.

With the abovementioned configurations, the present invention enables reduction of the possibility that the portion including the consecutive speech elements in the speech uttered by the speech registering user is acquired by the fraudulent user.

BRIEF DESCRIPTION OF THE DRAWINGS

FIG. 2 is a view showing a table, which is stored in a storing device of a client device shown in FIG. 1, and in which speech element specification information and speech element identification information are associated with each other;

FIGS. 3A to 3C are views showing a table, which is stored in the storing device of the client device shown in FIG. 1, and in which before-rearrangement order information, speech element identification information and a random number value are associated with one another;

FIG. 4 is a view showing a table, which is stored in a storing device of a server device shown in FIG. 1, and in which speech element identification information and speech element information are associated with each other;

FIGS. 8A and 8B are views showing tables, which are stored in respective storing devices of a server device and a client device shown in FIG. 7, and in which before-rearrangement order information and random number values are associated with each other;

EXEMPLARY EMBODIMENT

Below, respective embodiments of a speech synthesis system, a speech synthesis method, a server device, a server device program, a client device and a client device program according to the present invention will be described with reference to FIGS. 1 to 10.

<First Exemplary Embodiment>

Figure 1:
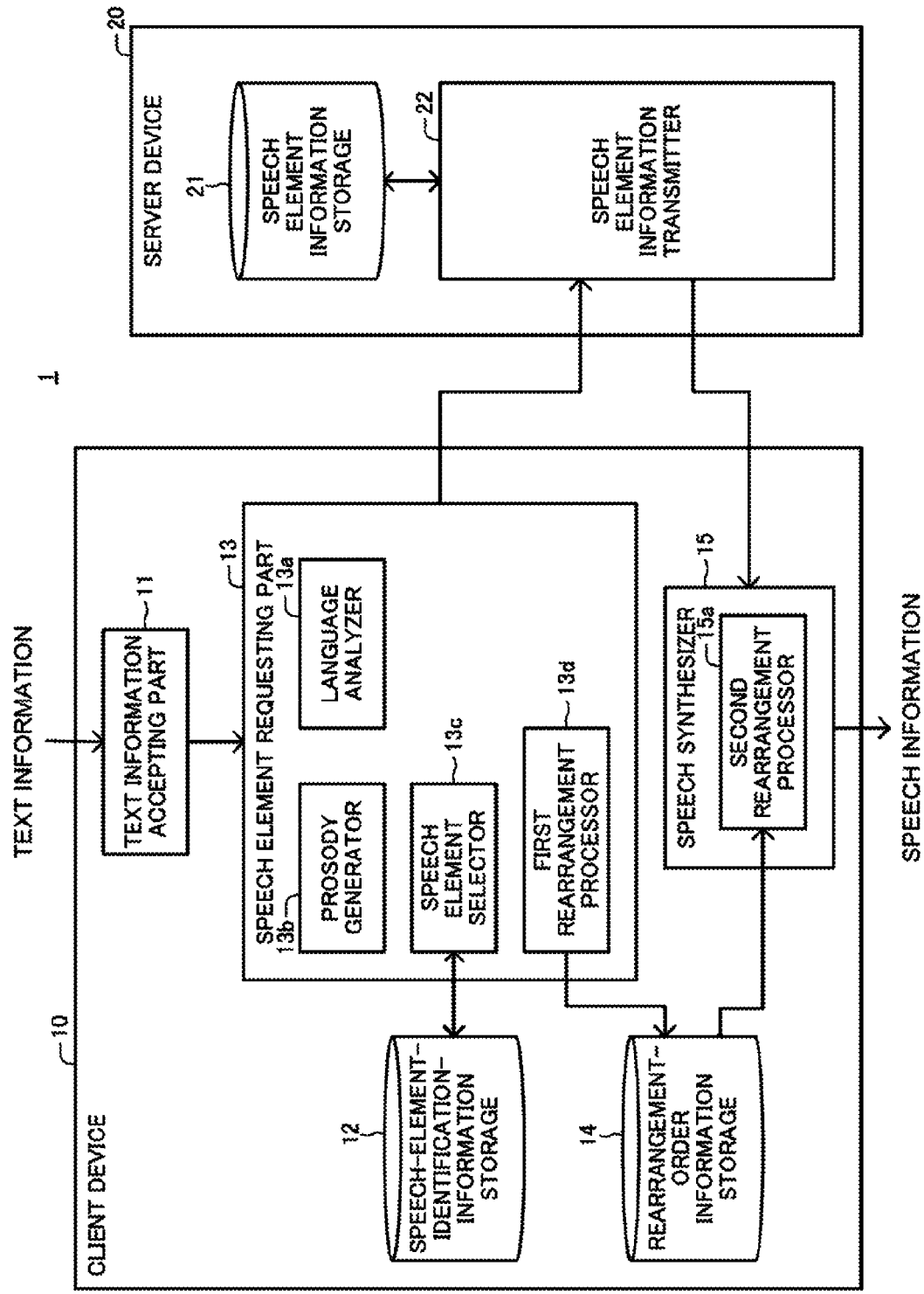
FIG. 1 is a block diagram schematically showing the function of a speech synthesis system according to a first embodiment of the present invention.
Figure 5:
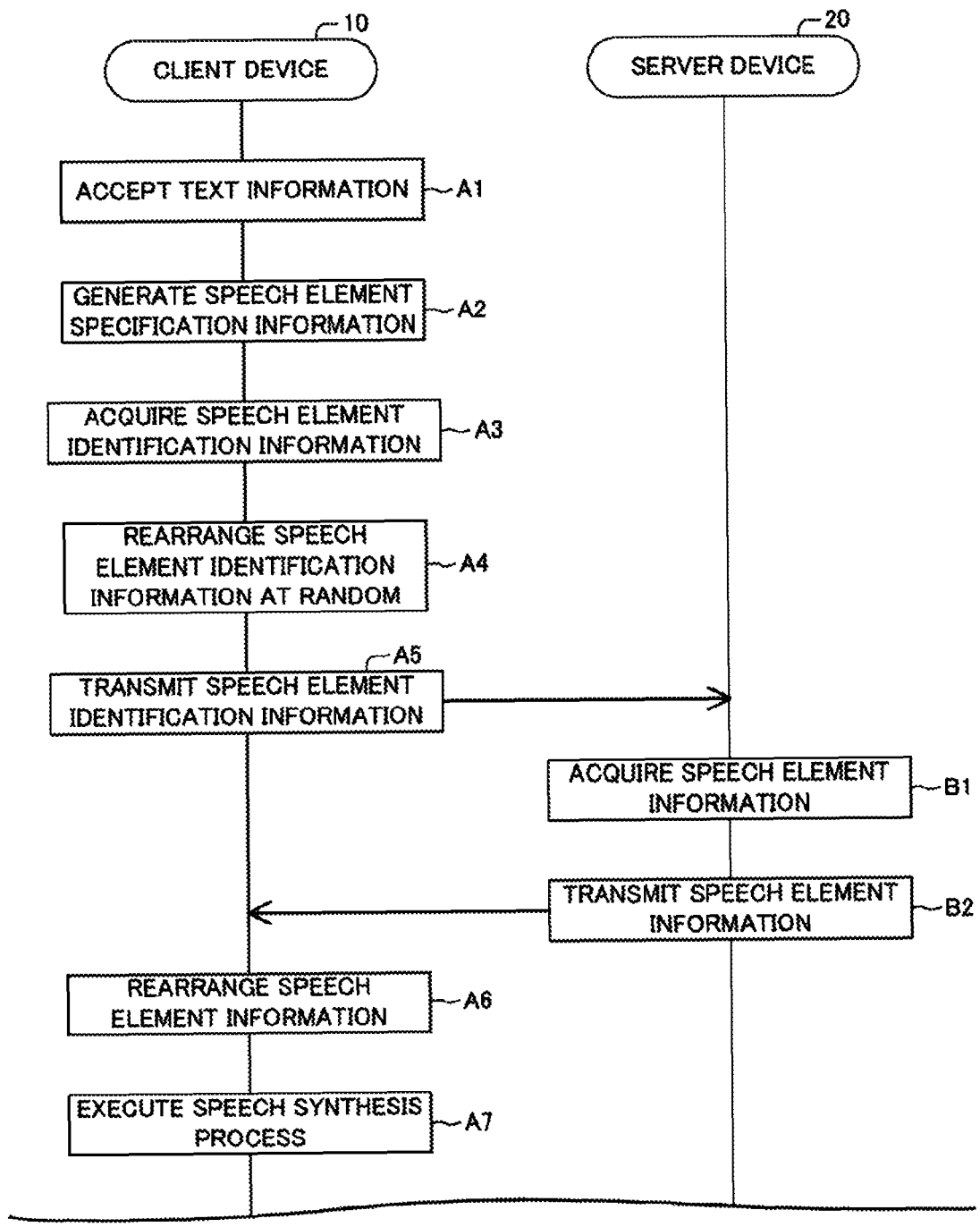
FIG. 5 is a sequence view showing the operation of the speech synthesis system according to the first embodiment of the present invention.

As shown in FIG. 1, a speech synthesis system 1 according to a first embodiment includes a client device 10 and a server device 20. The client device 10 and the server device 20 are connected so as to be capable of communicating with each other via a communication line (the Internet in this embodiment) that is not shown in the drawings.

The client device 10 is provided with a central processing unit (CPU), a storing device (a memory and a hard disk drive (HDD)), an input device (a mouse and a keyboard) and an output device (a display and a speaker), which are not shown in the drawings.

The client device 10 is configured to realize a function described later through execution by the CPU of a program (a client device program) stored in the storing device. Moreover, the client device 10 accepts text information inputted by a user via the keyboard. The text information is information representing text. Besides, the client device 10 causes the display to display an image including text. Moreover, the client device 10 causes the speaker to output speech.

In a like manner as the client device 10, the server device 20 is provided with a central processing unit, a storing device, an input device and an output device, which are not shown in the drawings. The server device 20 is configured to realize a function described later through execution by the CPU of a program (a server device program) stored in the storing device, in a like manner as the client device 10.

Furthermore, as shown in FIG. 1, the function of the client device 10 includes a text information accepting part (a text information accepting unit) 11, a speech-element-identification-information storage (a speech-element-identification-information storing unit, a speech-element-identification-information storing process unit) 12, a speech element requesting part (a speech element requesting unit) 13, a rearrangement-order information storage (a rearrangement-order information storing unit, a rearrangement-order information storing process unit, a rearrangement-order information storing process flow) 14, and a speech synthesizer (a speech synthesizing unit) 15.

The text information accepting part 11 accepts text information inputted by a user.

The speech-element-identification-information storage 12 causes the storing device of the client device 10 to store speech element specification information that specifies a speech element and speech element identification information that identifies speech element information in association with each other as shown in FIG. 2. Speech element specification information stored in association with speech element identification information by the speech-element-identification-information storage 12 is information that specifies a speech element represented by speech element information stored in association with the speech element identification information by the server device 20.

In this embodiment, a speech element is a syllable. A speech element may be a diphone. A diphone is, for example, a phone composed of a consonant and a vowel (for example, /ka/) and a phone composed of a vowel and a vowel (for example, /ai/).

Speech element specification information includes phoneme information representing a phoneme (a phonetic symbol) and prosody information representing a prosody (a pitch pattern (a central pitch or the like), a temporal length). Moreover, speech element identification information is information that represents an integer varying by speech element information.

The speech element requesting part 13 includes a language analyzer 13a, a prosody generator 13b, a speech element selector 13c, and a first rearrangement processor 13d.

The language analyzer 13a executes a language analysis process on text represented by the text information accepted by the text information accepting part 11 to generate a phoneme string and an accent. The language analysis process includes a process of analyzing the relation (the modification) of terms, categories and so on, and a process of specifying the position of the accent in text. An example of the language analysis process is disclosed in Japanese Patent Publications Nos. 3379643 and 3518340, and so on.

The prosody generator 13b generates prosody information based on the phoneme string and accent generated by the language analyzer 13a. The prosody information is information that is associated with each phoneme included in the phoneme string that represents a prosody. A prosody represents the height and length of a phone (i.e., a pitch pattern (a central pitch (average F0), inclination of F0 and so on) and a temporal length), and so on. An example of a process of generating the prosody information is disclosed in Japanese Patent Publications Nos. 3240691 and 3344487.

The speech element selector 13c selects a phoneme included in the phoneme string generated by the language analyzer 13a in order from the beginning of the phoneme string for each speech element. The speech element selector 13c extracts speech element specification information that includes phoneme information representing the selected phoneme, from among the speech element specification information stored in the storing device by the speech-element-identification-information storage 12.

The speech element selector 13c determines, from among the extracted speech element specification information, speech element specification information that includes prosody information closest to the prosody information generated by the prosody generator 13b. Then, the speech element selector 13c acquires speech element identification information stored in association with the determined speech element specification information. That is to say, the speech element selector 13c acquires, in the same order as the order of speech elements from the beginning of the text, speech element identification information for identifying the speech elements.

Further, the speech element selector 13c gives each of the acquired speech element identification information, before-rearrangement order information representing the order of acquisition of the speech element identification information (refer to FIG. 3A). That is to say, the speech element selector 13c gives before-rearrangement order information representing an integer that increases by 1 every time speech element identification information is acquired, to the acquired speech element identification information.

The first rearrangement processor 13d rearranges the speech element identification information acquired by the speech element selector 13c and the before-rearrangement order information given to the speech element identification information at random, with respect to the order of acquisition of the speech element identification information (i.e., the order of arrangement of the speech elements in the speech corresponding to the text represented by the accepted text information).

The speech element requesting part 13 transmits the speech element identification information rearranged by the first rearrangement processor 13d one by one in order from the beginning, as a speech element request, to the server device 20. The speech element request is information of a request of speech element information representing each of the speech elements composing the speech corresponding to the text represented by the text information accepted by the text information accepting part 11.

Thus, the speech element requesting part 13 rearranges speech element identification information so that the speech element identification information is received by the server device 20 in a different order from the order of arrangement of the speech elements in the speech corresponding to the text. Moreover, the speech element requesting part 13 transmits the rearranged speech element identification information as the speech element request to the server device 20.

The rearrangement-order information storage 14 causes the storing device of the client device 10 to store the before-rearrangement order information after rearrangement of the speech element identification information by the first rearrangement processor 13d. It can be said that the before-rearrangement order information is rearrangement-order information that represents a relation between the order of arrangement of the speech element identification information before rearrangement of the speech element identification information and the order of arrangement of the speech element identification information after rearrangement of the speech element identification information.

The speech synthesizer 15 receives speech element information transmitted by the server device 20 one by one in order.

The speech synthesizer 15 includes a second rearrangement processor 15a. The second rearrangement processor 15a rearranges the received speech element information based on the before-rearrangement order information stored in the storing device of the client device 10 so that speech elements represented by the received speech element information are arranged in the same order as the order of arrangement of the speech elements in the speech corresponding to the text.

Then, the speech synthesizer 15 converts prosodies of the speech elements represented by the speech element information, based on the rearranged speech element information and the phoneme string and prosody information generated by the speech element requesting part 13. Moreover, the speech synthesizer 15 connects the converted speech elements to generate speech information obtained by converting the text into speech (i.e., execute a speech synthesis process).

Next, the client device 10 outputs the speech represented by the speech information generated by the speech synthesizer 15, from the speaker.

On the other hand, the function of the server device 20 includes a speech element information storage (a speech element information storing unit, a speech element information storing process unit, a speech element information storing process flow) 21, and a speech element information transmitter (a speech element information transmitting unit) 22.

The speech element information storage 21 accepts speech information representing speech uttered by a speech registering user. The speech element information storage 21 divides the speech represented by the accepted speech information into speech elements to generate speech element information representing the respective speech elements. The speech element information storage 21 causes the storing device of the server device to store each of the generated speech element information and speech element identification information representing an integer in association with each other as shown in FIG. 4.

The speech element information transmitter 22 receives the speech element identification information transmitted by the client device 10 one by one in order. The speech element information transmitter 22, every time receiving speech element identification information, acquires speech element information stored in association with the received speech element identification information from among the speech element information stored in the storing device by the speech element information storage 21, and transmits the acquired speech element information to the client device 10. That is to say, the speech element information transmitter 22, in the order of reception of speech element identification information, transmits the speech element information stored in the storing device in association with the received speech element identification information to the client device 10.

Thus, the speech element information transmitter 22, in response to the speech element request received from the client device 10, transmits speech element information to the client device 10 so that the speech element information is received by the client device 10 in a different order from the order of arrangement of the speech elements in the speech corresponding to the text.

Next, the operation of the speech synthesis system 1 described above will be described with reference to FIG. 5.

First, a user of the client device 10 (a speech synthesizing user) inputs text information into the client device 10 by using the keyboard.

The client device 10 accepts the inputted text information (step A1, a text information reception flow).

Next, the client device 10 generates speech element specification information (phoneme information, prosody information, and so on) based on the accepted text information (step A2). The client device 10 generates speech element specification information specifying speech elements one by one in the same order as the order of the speech elements from the beginning in the text.

Then, the client device 10, every time the speech element specification information is generated, acquires speech element identification information stored in the storing device of the client device 10 in association with the generated speech element specification information (step A3).

Next, the client device 10 rearranges the acquired speech element identification information at random with respect to the order of acquisition of the speech element identification information (step A4). Moreover, the client device 10 causes the storing device of the client device 10 to store before-rearrangement order information. Then, the client device 10 transmits the rearranged speech element identification information one by one in order to the server device 20 (step A5, a speech element request flow).

On the other hand, the server device 20 receives the speech element identification information transmitted by the client device 10 one by one in order (part of a speech element information transmission flow). Then, the server device 20, every time receiving the speech element identification information, acquires speech element information stored in the storing device of the server device 20 in association with the received speech element identification information (step B1, part of the speech element information transmission flow). Moreover, the server device 20, every time acquiring the speech element information, transmits the acquired speech element information to the client device 10 (step B2, part of the speech element information transmission flow).

Thus, the client device 20 receives the speech element information one by one in order from the server device 20 (part of a speech synthesis flow). Then, the client device 10 rearranges the received speech element information based on the stored before-rearrangement order information so that speech elements represented by the received speech element information are arranged in the same order as the order of arrangement of the speech elements in the speech corresponding to the text (step A6, part of the speech synthesis flow).

Next, the client device 10 generates speech information obtained by converting the text represented by the received text information into speech (executes a speech synthesis process), based on the rearranged speech element information (step A7, part of the speech synthesis flow).

After that, the client device 10 outputs the speech represented by the generated speech information, from the speaker.

A process executed by the client device 10 for rearranging speech element identification information at random (the process from step A3 to step A5 in FIG. 5) will be described in more detail.

Figure 6:
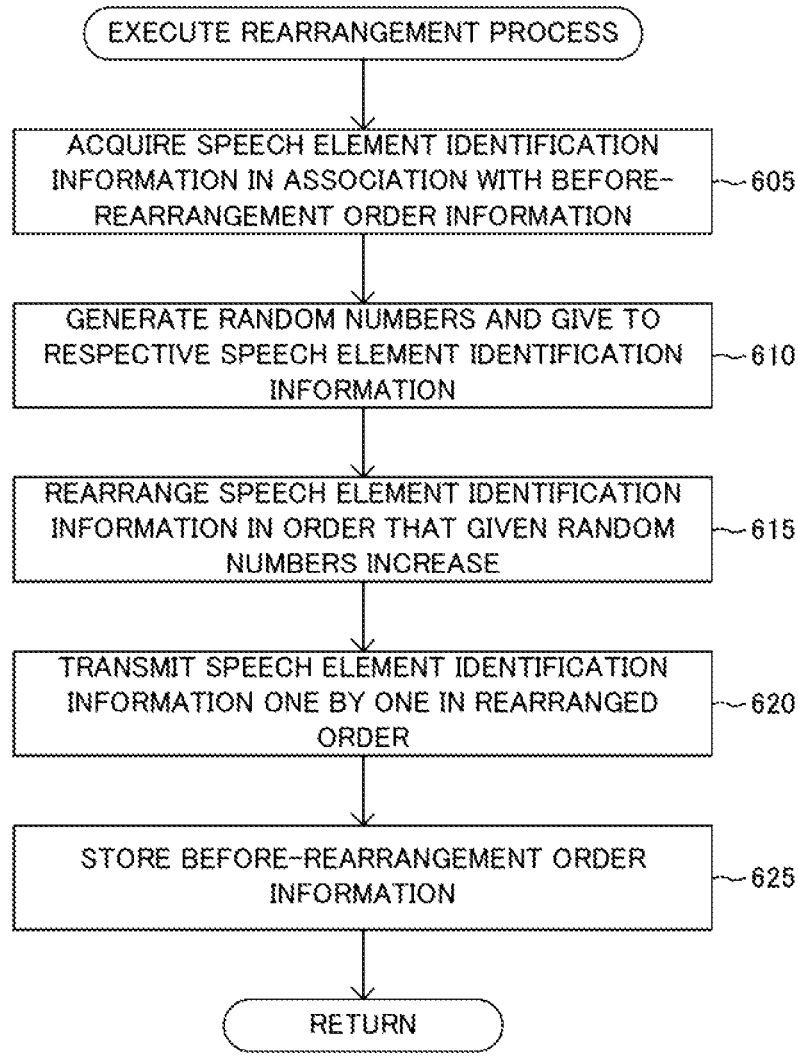
FIG. 6 is a flow chart showing a rearrangement process execution program executed by a CPU of the client device shown in FIG. 1.

The CPU of the client device 10 is configured to execute a rearrangement process execution program shown by a flowchart in FIG. 6, after accepting text information and generating speech element specification information.

To be specific, at step 605, the CPU acquires speech element identification information stored in association with the generated speech element specification information. As described before, the CPU acquires the speech element identification information for identifying the speech elements in the same order as the order of the speech elements from the beginning of the text.

Further, every time acquiring the speech element identification information, the CPU causes the storing device to store the acquired speech element identification information and before-rearrangement order information representing the order of acquisition of the speech element identification information in association with each other (store the speech element identification information to which the before-rearrangement order information has been given) (refer to FIG. 3A).

Next, at step 610, the CPU generates a random integer (in this embodiment, a pseudorandom number) for each of the speech element identification information stored at step 605, and causes the storing device to store the generated random number (random number value) in association with the speech element identification information (gives a random number value to the speech element identification information, refer to FIG. 3B).

Then, at step 615, the CPU rearranges the speech element identification information and the before-rearrangement order information associated with the speech element identification information so that the given (associated) random number values increase from the beginning to the end (refer to FIG. 3C). Consequently, the speech element identification information is rearranged at random with respect to the order of arrangement of the speech elements in the speech corresponding to the text.

Next, at step 620, the CPU transmits, to the server device 20, the speech element identification information rearranged at step 620 one by one in order from the beginning. Then, at step 625, the CPU causes the storing device of the client device 10 to store the before-rearrangement order information rearranged at step 615 as rearrangement-order information. Next, the CPU ends execution of this program.

A process (the process at step A6 in FIG. 5) executed by the client device 10 when rearranging the speech element information received from the server device 20 in order to execute the speech synthesis process will be described in more detail.

Every time receiving speech element information from the server device, the CPU of the client device 10 causes the storing device to store before-rearrangement order information that is not yet associated with speech element information among the before-rearrangement order information stored in the storing device and that is located at the beginning, and the received speech element information in association with each other. That is to say, the CPU causes the storing device to store received speech element information and before-rearrangement order information in association with each other one by one in order from the beginning of the before-rearrangement order information.

Then, the CPU rearranges the stored speech element information and before-rearrangement order information so that integers represented by the before-rearrangement order information increase from the beginning to the end. Consequently, the speech element information is arranged in the order of arrangement of the speech elements in the speech corresponding to the text (i.e., the speech element information representing speech elements are arranged in the same order as the order of the speech elements from the beginning of the text).

As described above, according to the first embodiment of the speech synthesis system of the present invention, the server device 20 transmits speech element information to the client device 10 so that the speech element information is received by the client device 10 in a different order from the order of arrangement of speech elements in speech corresponding to text as the target of a speech synthesis process. Consequently, in case information transmitted from the server device 20 to the client device 10 is monitored by a fraudulent user, it is possible to reduce a possibility that a portion including consecutive speech elements in speech uttered by a speech registering user is acquired by the fraudulent user in a state that the order of arrangement of the speech elements in the speech is maintained.

Further, even if information transmitted from the server device 20 to the client device 10 is monitored by a fraudulent user, the fraudulent user cannot easily know the text. That is to say, according to the above configuration, it is possible to prevent that text as the target of a speech synthesis process is easily known by a fraudulent user.

Further, in the first embodiment, the client device 10 stores rearrangement-order information that represents a relation between the order of arrangement of the speech element identification information before rearrangement of the speech element identification information and the order of arrangement of the speech element identification information after rearrangement of the speech element identification information. Then, the client device 10 rearranges the speech element information received from the server device 20 based on the stored rearrangement-order information.

Consequently, it is possible to securely make the order of arrangement of speech elements represented by the rearranged speech element information agree with the order of arrangement of speech elements in speech corresponding to text as the target of a speech synthesis process. Moreover, with above configuration, the client device 10 can set a relation between the order of arrangement of the speech element identification information before rearrangement of the speech element identification information and the order of arrangement of the speech element identification information after rearrangement of the speech element identification information, to any relation (in a disordered relation in this embodiment). As a result, it is possible to further reduce a possibility that a portion including consecutive speech elements in speech uttered by a speech registering user is acquired by a fraudulent user in a state that the order of speech elements in the speech is maintained.

<Second Exemplary Embodiment>

Next, a speech synthesis system according to a second embodiment of the present invention will be described. The speech synthesis system according to the second embodiment is different from the speech synthesis system according to the first embodiment in that: the client device 10 transmits speech element identification information without rearranging and the server device 20 transmits speech element information after rearranging. Therefore, a description will be made below focusing on such a difference.

Figure 7:
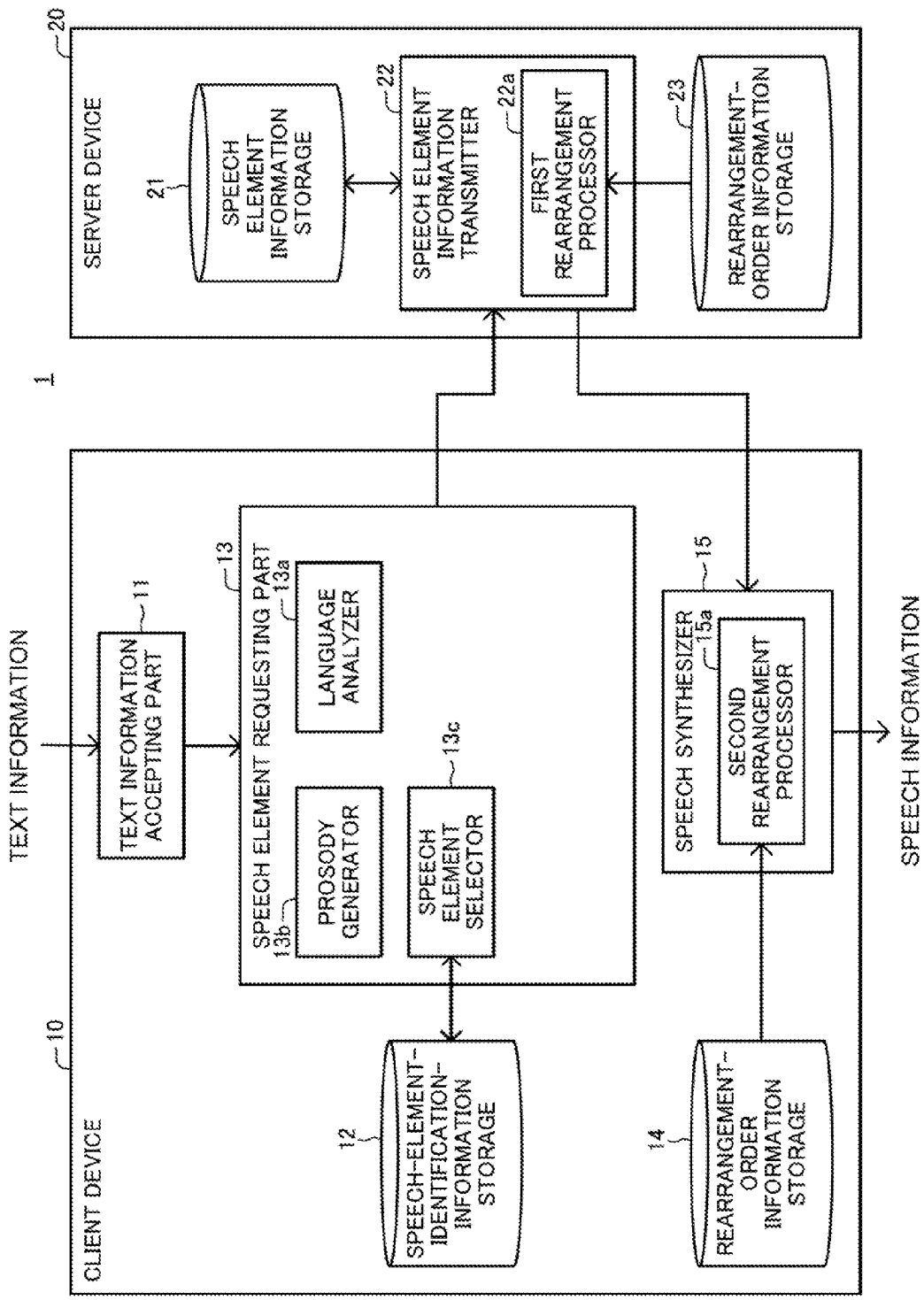
FIG. 7 is a block diagram schematically showing the function of a speech synthesis system of a second embodiment of the present invention.

As shown in FIG. 7, the speech element requesting part 13 of the second embodiment does not include the first rearrangement processor 13*d*.

Moreover, the speech element requesting part 13 transmits speech element identification information acquired by the speech element selector 13c as a speech element request one by one in the order of acquisition of the speech element identification information (i.e., in the order of arrangement of speech elements in speech corresponding to text represented by the received text information), to the server device 20.

On the other hand, the function of the server device 20 includes a rearrangement-order information storage (a server-side rearrangement-order information storing unit, a server-side rearrangement-order information storing process unit, a server-side rearrangement-order information storing process flow) 23.

The rearrangement-order information storing unit 23 causes the storing device of the server device 20 to previously store before-rearrangement order information and random number values in association with each other as shown in FIG. 8A. The before-rearrangement order information is information that represents integers increasing by 1 in the order from the beginning. The random number value is a random integer (a pseudorandom number in this embodiment) generated for each of the before-rearrangement order information. The before-rearrangement order information and random number values stored in the storing device of the server device 20 by the rearrangement-order information storage 23 compose rearrangement-order information that represents a rule of rearrangement of speech element information.

On the other hand, the rearrangement-order information storage (a client-side rearrangement-order information storing unit, a client-side rearrangement-order information storing process unit, a client-side rearrangement-order information storing process flow) 14, which is the function of the client device 10, causes the storing device of the client device 10 to previously store the before-rearrangement order information and the random number values in association with each other. A pair of the before-rearrangement order information and the random number value associated with each other by the rearrangement-order information storage 14 is identical to a pair of the before-rearrangement order information and the random number value associated with each other by the rearrangement-order information storage 23.

The information stored in the storing device of the client device 10 by the rearrangement-order information storage 14 is information that the before-rearrangement order information and random number values stored in the storing device of the server device 20 by the rearrangement-order information storage 23 are rearranged so that the random number values increase from the beginning to the end as shown in FIG. 8B.

Further, the speech element information transmitter 22, which is the function of the server device 20, receives the speech element identification information transmitted by the client device 10, one by one in order. The speech element information transmitter 22, every time receiving speech element identification information, acquires speech element information stored in association with the received speech element identification information from among speech element information stored in the storing device by the speech element information storage 21.

Further, the speech element information transmitter 22 includes a first rearrangement processor 22a.

The first rearrangement processor 22a rearranges the acquired speech element information in accordance with a rule represented by the rearrangement-order information stored in the storing device by the rearrangement-order information storage 23.

To be specific, every time acquiring speech element information, the first rearrangement processor 22a causes the storing device to store before-rearrangement order information that is not yet associated with speech element information among the before-rearrangement order information stored in the storing device and that is located at the beginning, and the acquired speech element information in association with each other. That is to say, the first rearrangement processor 22a causes the storing device to store the acquired speech element information and before-rearrangement order information in association with each other one by one in order from the beginning of the before-rearrangement order information.

Then, the first rearrangement processor 22a rearranges the stored speech element information and before-rearrangement order information so that random number values increase from the beginning to the end. Thus, the speech element information is arranged in a different order from the order of arrangement of speech elements in speech corresponding to the text (i.e., speech element information representing speech elements are arranged in a different order from the order of the speech elements from the beginning in the text).

Then, the speech element information transmitter 22 transmits the rearranged speech element information one by one in order, to the client device 10. Thus, the speech element information transmitter 22, in response to the speech element request received by the client device 10, transmits speech element information to the client device 10 so that the speech element information is received by the client device 10 in a different order from the order of arrangement of speech elements in speech corresponding to the text.

On the other hand, the second rearrangement processor 15a rearranges the speech element information received from the server device 20 in accordance with a rule represented by the rearrangement-order information stored in the storing device by the rearrangement-order information storage 14.

To be specific, every time receiving speech element information, the second rearrangement processor 15a causes the storing device to store before-rearrangement order information that is not yet associated with speech element information among the before-rearrangement order information stored in the storing device of the client device 10 and that is located at the beginning, and the received speech element information in association with each other. That is to say, the second rearrangement processor 15a causes the storing device to store the received speech element information and before-rearrangement order information one by one in order from the beginning of the before-rearrangement order information.

Then, the second rearrangement processor 15a rearranges the stored speech element information, and before-rearrangement order information so that integers represented by the before-rearrangement order information increase from the beginning to the end. Consequently, the speech element information is arranged in the order of arrangement of speech elements in speech corresponding to the text (that is, speech element information representing speech elements are arranged in the order of the speech elements in the order of speech elements from the beginning of the text).

Figure 9:
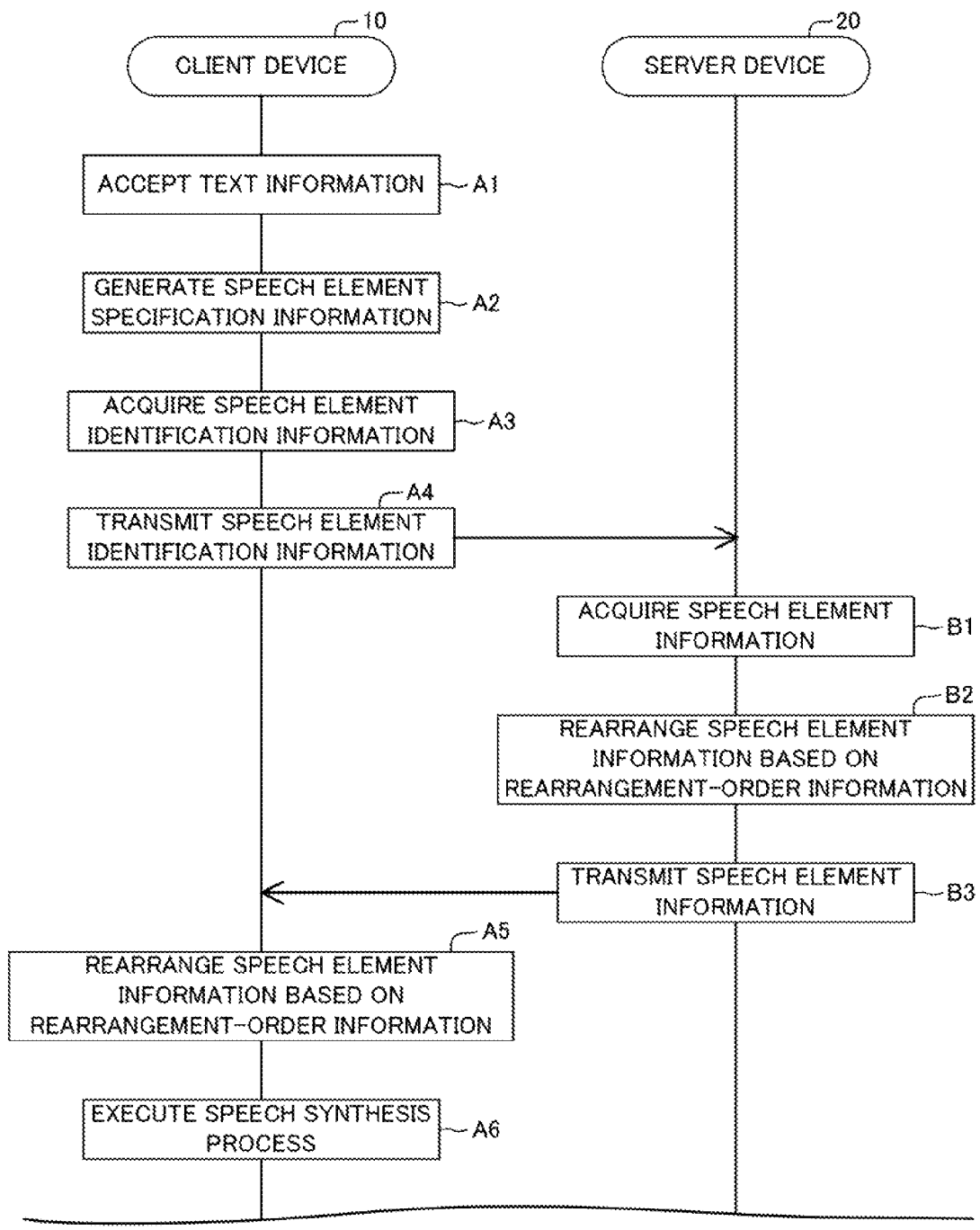
FIG. 9 is a sequence view showing the operation of the speech synthesis system according to the second embodiment of the present invention.

Next, the operation of the speech synthesis system 1 will be described with reference to FIG. 9.

Firstly, a user of the client device 10 (a speech synthesizing user) inputs text information into the client device 10 by using the keyboard.

The client device 10 accepts the inputted text information (step A1, a text information reception flow).

Next, the client device 10 generates speech element specification information (phoneme information, prosody information, and so on) based on the accepted text information (step A2). The client device 10 generates speech element specification information specifying speech elements one by one in the same order as the order of the speech elements from the beginning of the text.

Then, every time speech element specification information is generated, the client device 10 acquires speech element identification information stored in the storing device of the client device 10 in association with the generated speech element specification information (step A3).

Next, the client device 10 transmits the acquired speech element identification information to the server device 20 one by one in the order of acquisition of the speech element identification information (step A4, a speech element request flow).

On the other hand, the server device 20 receives the speech element identification information transmitted by the client device 10 one by one in order (part of a speech element information transmission flow). Then, every time receiving speech element identification information, the server device 20 acquires speech element information stored in the storing device of the server device 20 in association with the received speech element identification information (step B1, part of the speech element information transmission flow).

Then, the server device 20 rearranges the acquired speech element information based on the rearrangement-order information stored in the storing device of the server device 20 (step B2, part of the speech element information transmission flow). Next, the server device 20 transmits the rearranged speech element information one by one in order from the beginning to the client device 10 (step B3, part of the speech element transmission flow).

Thus, the client device 10 receives the speech element information one by one in order from the server device 20 (part of the speech synthesis flow). Then, the client device 10 rearranges the received speech element information based on the stored rearrangement-order information so that speech elements represented by the received speech element information are arranged in the same order as the order of arrangement of speech elements in speech corresponding to the text (step A5, part of the speech synthesis flow).

Next, the client device 10 generates speech information obtained by converting text represented by the received text information into speech (executes a speech synthesis process), based on the rearranged speech element information (step A6, part of the speech synthesis flow).

After that, the client device 10 outputs the speech represented by the generated speech information, from the speaker.

As described above, according to the second embodiment of the speech synthesis system of the present invention, the server device 20 transmits speech element information to the client device 10 so that the speech element information is received by the client device 10 in a different order from the order of arrangement of speech elements in speech corresponding to text as the target of a speech synthesis process. Thus, in case information transmitted from the server device 20 to the client device 10 is monitored by a fraudulent user, it is possible to reduce a possibility that, a portion including consecutive speech elements in speech uttered by a speech registering user is acquired by the fraudulent user in a state that the order of the speech elements in speech is maintained.

Further, even if information transmitted from the server device 20 to the client device 10 is monitored by a fraudulent user, the fraudulent user cannot easily know the text. That is to say, according to the above configuration, it is possible to prevent that text as the target of a speech synthesis process is easily known by a fraudulent user.

Further, in the second embodiment, the server device 20 transmits speech element information after rearranging based on previously stored rearrangement-order information, and the client device 10 rearranges the received speech element information based on previously stored rearrangement-order information, which corresponds to the rearrangement-order information stored by the server device 20.

Thus, the client device 10 can securely make the order of arrangement of speech elements represented by the rearranged speech element information agree with the order of arrangement of speech elements in speech corresponding to text as the target of a speech synthesis process. Moreover, according to the above configuration, the speech synthesis system 1 can set any rule for rearranging speech element information. As a result, it is possible to further reduce a possibility that a portion including consecutive speech elements in speech uttered by a speech registering user is acquired by a fraudulent user in a state that the order of arrangement of the speech elements in the speech is maintained.

<Third Exemplary Embodiment>

Figure 10:
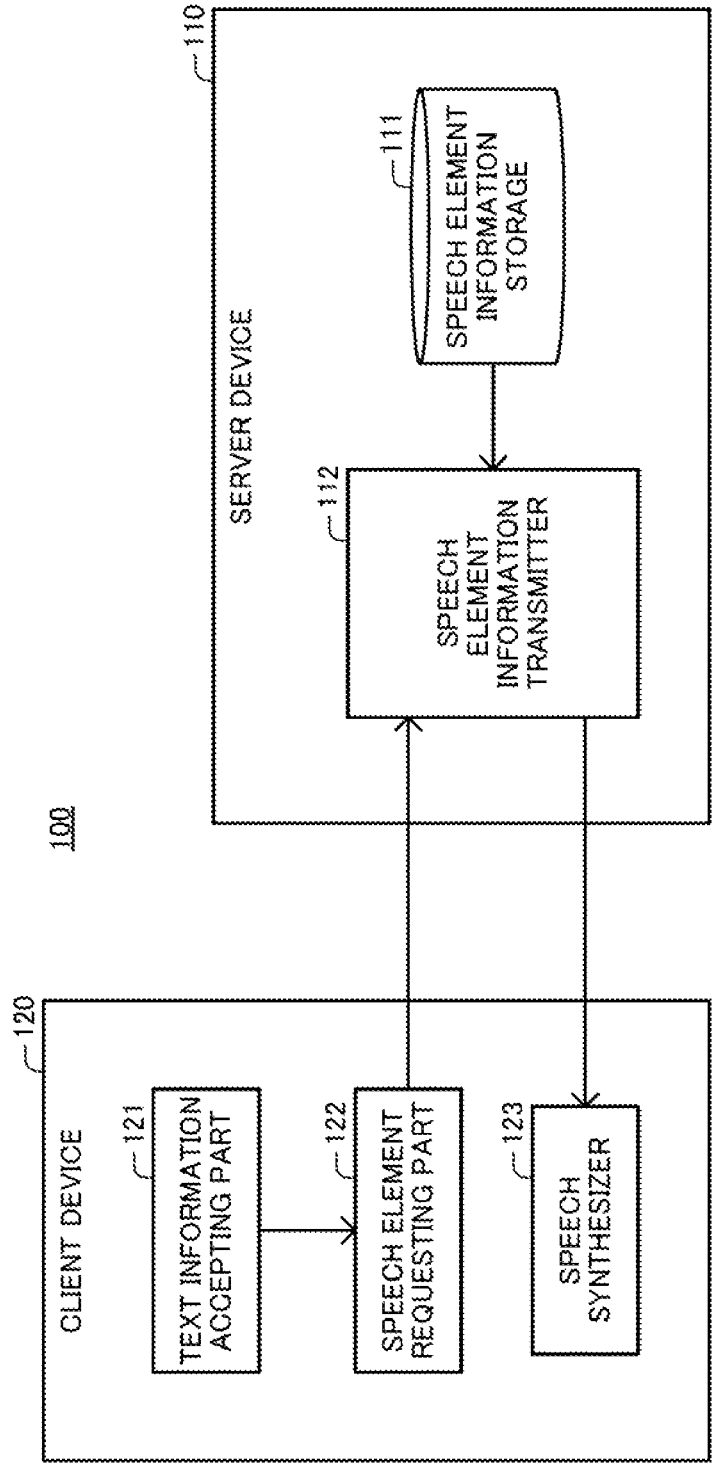
FIG. 10 is a block diagram schematically showing the function of a speech synthesis system according to a third embodiment of the present invention.

Next, a speech synthesis system according to a third embodiment of the present invention will be described with reference to FIG. 10.

A speech synthesis system 100 according to the third embodiment is a system including a server device 110 and a client device 120 connected so as to be capable of communicating with each other.

The function of the server device 110 includes a speech element information storage (a speech element information storing unit) 111, and a speech element information transmitter (a speech element information transmitting unit) 112.

Moreover, the function of the client device 120 includes a text information accepting part (a text information accepting unit) 121, a speech element requesting part (a speech element requesting unit) 122, and a speech synthesizer (a speech synthesizing unit) 123.

The text information accepting part 121 accepts text information representing text.

The speech element requesting part 122 transmits a speech element request for requesting speech element information representing respective speech elements composing speech corresponding to text represented by the text information accepted by the text information accepting part 121, to the server device 110.

The speech element information storage 111 stores speech element information representing respective speech elements included in speech uttered by a speech registering user.

The speech element information transmitter 112 receives the speech element request transmitted by the client device 120 and, in response to the received speech element request, transmits the speech element information stored in the speech element information storage 111 to the client device 120 so that the speech element information is received by the client device 120 in a different order from the order of arrangement of the speech elements in the speech corresponding to the text.

The speech synthesizer 123 receives the speech element information transmitted by the server device 110, and rearranges the received speech element information so that speech elements represented by the received speech element information are arranged in the same order as the order of arrangement of the speech elements in the speech corresponding to the text accepted by the text information accepting part 121. The speech synthesizer 123 generates speech information obtained by converting the text into speech based on the rearranged speech element information.

According to the above, the server device 110 transmits speech element information to the client device 120 so that the speech element information is received by the client device 120 in a different order from the order of arrangement of speech elements in speech corresponding to text as the target of a speech synthesis process. Consequently, even if information transmitted from the server device 110 to the client device 120 is monitored by a fraudulent user, it is possible to reduce a possibility that a portion including consecutive speech elements in speech uttered by a speech registering user is acquired by the fraudulent user in a state that the order of arrangement of the speech elements in the speech is maintained.

In this case, it is favorable that: the speech element information storing unit is configured to store the speech element information and speech element identification information for identifying the speech element information in association with each other; the speech element requesting unit is configured to transmit the speech element identification information as the speech element request to the server device; and the speech element information transmitting unit is configured to transmit speech element information stored in association with the received speech element identification information.

In this case, it is favorable that: the speech element requesting unit is configured to rearrange the speech element identification information so that the speech element identification information is received by the server device in a different order from the order of arrangement of the speech elements in the speech corresponding to the text, and transmit the rearranged speech element identification information as the speech element request to the server device; the speech element information transmitting unit is configured to transmit speech element information stored in association with the received speech element identification information, in an order of reception of the speech element identification information; the client device further includes a rearrangement-order information storing unit configured to store rearrangement-order information representing a relation between an order of arrangement of the speech element identification information before the speech element identification information is rearranged and an order of arrangement of the speech element identification information after the speech element identification information is rearranged; and the speech synthesizing unit is configured to rearrange the received speech element information based on the stored rearrangement-order information.

According to the above, the client device can securely make the order of arrangement of speech elements represented by rearranged speech element information agree with the order of speech elements in speech corresponding to text as the target of a speech synthesis process. Moreover, according to the above configuration, the client device can set any relation between the order of arrangement of the speech element identification information before the speech element identification information is rearranged and the order of arrangement of the speech element identification information after the speech element identification information is rearranged. As a result, it is possible to further reduce a possibility that a portion including consecutive speech elements in speech uttered by a speech registering user is acquired by a fraudulent user in a state that the order of arrangement of the speech elements in the speech is maintained.

In this case, it is favorable that the speech element requesting unit is configured to rearrange the speech element identification information at random.

Further, in another embodiment of the speech synthesis system, it is favorable that: the server device includes a server-side rearrangement-order information storing unit configured to store rearrangement-order information representing a rule for rearranging the speech element information; the client device includes a client-side rearrangement-order information storing unit configured to store the rearrangement-order information; the speech element information transmitting unit is configured to rearrange the speech element information in accordance with a rule represented by the rearrangement-order information stored by the server-side rearrangement-order information storing unit, and transmit the rearranged speech element information to the client device; and the speech synthesizing unit is configured to rearrange the received speech element information based on the rearrangement-order information stored by the client-side rearrangement-order information storing unit.

According to the above, the client device can securely make the order of arrangement of speech elements represented by rearranged speech element information agree with the order of arrangement of speech elements in speech corresponding to text as the target of a speech synthesis process. Moreover, according to the above configuration, the speech synthesis system can set any rule for rearranging speech element information. As a result, it is possible to further reduce a possibility that a portion including consecutive speech elements in speech uttered by a speech registering user is acquired by a fraudulent user in a state that the order of arrangement of the speech elements in the speech is maintained.

In this case, it is favorable that the speech element information storing unit is configured to store first speech element information of low sound quality and second speech element information of higher sound quality than the first speech element information, as the speech element information representing one speech element.

The amount of data (the size of data) of speech element information of low sound quality is smaller than that of speech element information of high sound quality. Therefore, according to the above configuration, the speech synthesis system is capable of executing a speech synthesis process based on first speech element information of low sound quality in a case that rapid transmission of speech element information and/or reduction of communication load is required, whereas executing a speech synthesis process based on second speech element information of high sound quality in a case that the quality of generated speech information needs to be high. Consequently, it is possible to increase convenience for a user who uses the client device.

Further, a speech synthesis method as another embodiment of the present invention includes: accepting text information representing text, by a client device; transmitting a speech element request for requesting speech element information representing respective speech elements composing speech corresponding to the text represented by the accepted text information, to a server device, by the client device; receiving the speech element request transmitted by the client device and, in response to the received speech element request, transmitting speech element information, which is information stored in a storing device of the server device and is information representing respective speech elements included in speech uttered by a speech registering user, to the client device so that the speech element information is received by the client device in a different order from an order of arrangement of the speech elements in the speech corresponding to the text, by the server device; and receiving the speech element information transmitted by the server device, rearranging the received speech element information so that speech elements represented by the received speech element information are arranged in a same order as the order of arrangement of the speech elements in the speech corresponding to the text, and generating speech information obtained by converting the text into speech based on the rearranged speech element information, by the client device.

In this case, it is favorable that: the storing device is configured to store the speech element information and speech element identification information for identifying the speech element information in association with each other; and the speech synthesis method includes transmitting the speech element identification information as the speech element request to the server device, by the client device, and transmitting speech element information stored in the storing device in association with the received speech element identification information to the client device, by the server device.

In this case, it is favorable that the speech synthesis method includes: rearranging the speech element identification information so that the speech element identification information is received by the server device in a different order from the order of arrangement of the speech elements in the speech corresponding to the text, and transmitting the rearranged speech element identification information as the speech element request to the server device, by the client device; transmitting speech element information stored in association with the received speech element identification information in an order of reception of the speech element identification information, to the client device, by the server device; causing a storing device of the client device to store rearrangement-order information representing a relation between an order of arrangement of the speech element identification information before the speech element identification information is rearranged and an order of arrangement of the speech element identification information after the speech element identification information is rearranged, by the client device; and rearranging the received speech element information based on the stored rearrangement-order information, by the client device.

Further, it is favorable that the speech synthesis method as another embodiment of the present invention includes: rearranging the speech element information in accordance with a rule represented by rearrangement-order information, which is information stored in the storing device of the server device and is information representing a rule for rearranging the speech element information, and transmitting the rearranged speech element information to the client device, by the server device; and rearranging the received speech element information based on the rearrangement-order information stored in the storing device of the client device, by the client device.

Further, a server device as another embodiment of the present invention is a device connected to a client device so as to be capable of communicating therewith.

Further, the server device includes: a speech element information storing unit configured to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text.

In this case, it is favorable that: the server device includes a server-side rearrangement-order information storing unit configured to store rearrangement-order information representing a rule for rearranging the speech element information; and the speech element information transmitting unit is configured to rearrange the speech element information in accordance with a rule represented by the rearrangement-order information stored by the server-side rearrangement-order information storing unit, and transmit the rearranged speech element information to the client device.

Further, a server device program product as another embodiment of the present invention is a server device program product including computer implementable instructions for causing a server device connected to a client device so as to be capable of communicating therewith, to realize: a speech element information storing process unit configured to cause a storing device of the server device to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text.

In this case, it is favorable that: the server device program product further includes a computer implementable instruction for causing the server device to realize a server-side rearrangement-order information storing process unit configured to cause the storing device of the server device to store rearrangement-order information representing a rule for rearranging the speech element information; and the speech element information transmitting unit is configured to rearrange the speech element information in accordance with a rule represented by the rearrangement-order information stored in the storing device of the server device, and transmit the rearranged speech element information to the client device.

Further, a client device as another embodiment of the present invention is a device connected to a server device so as to be capable of communicating therewith.

Further, this client device includes: a text information accepting unit configured to accept text information represented by text; a speech element requesting unit configured to transmit, to the server device, a speech element request for requesting speech element information representing respective speech elements composing speech corresponding to the text represented by the accepted text information; and a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information.

In this case, it is favorable that the speech element requesting unit is configured to transmit, to the server device, speech element identification information for identifying the speech element information, as the speech element request.

In this case, it is favorable that: the speech element requesting unit is configured to rearrange the speech element identification information so that the speech element identification information is received by the server device in a different order from the order of arrangement of the speech elements in the text corresponding to the text, and transmit the rearranged speech element identification information as the speech element request to the server device; the client device includes a rearrangement-order information storing unit configured to store rearrangement-order information representing a relation between an order of arrangement of the speech element identification information before the speech element identification information is rearranged and an order of arrangement of the speech element identification information after the speech element identification information is rearranged; and the speech synthesizing unit is configured to rearrange the received speech element information based on the stored rearrangement-order information.

Further, it is favorable that a client device as another embodiment of the present invention includes a client-side rearrangement-order information storing unit configured to store rearrangement-order information representing a rule for rearranging the speech element information, and the speech synthesizing unit is configured to rearrange the received speech element information based on the rearrangement-order information stored by the client-side rearrangement-order information storing unit.

Further, a client device program product as another embodiment of the present invention is a client device program product including computer implementable instructions for causing a client device connected to a server device so as to be capable of communicating therewith, to realize: a text information accepting unit configured to accept text information representing text; a speech element requesting unit configured to transmit, to the server device, a speech element request for requesting speech element information representing respective speech elements composing speech corresponding to the text represented by the accepted text information; and a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information.

In this case, it is favorable that the speech element requesting unit is configured to transmit, to the server device, speech element identification information for identifying the speech element information, as the speech element request.

Further, in another embodiment of the client device program product, it is favorable that: the speech element requesting unit is configured to rearrange the speech element identification information so that the speech element identification information is received by the server device in a different order from the order of arrangement of the speech elements in the speech corresponding to the text, and transmit the rearranged speech element identification information as the speech element request to the server device; the client device program product further includes computer implementable instructions for causing the client device to realize a rearrangement-order information storing process unit configured to cause a storing device of the client device to store rearrangement-order information representing a relation between an order of arrangement of the speech element identification information before the speech element identification information is rearranged and an order of arrangement of the speech element identification information after the speech element identification information is rearranged; and the speech synthesizing unit is configured to rearrange the received speech element information based on the rearrangement-order information stored in the storing device of the client device.

Further, it is favorable that the client device program product as another embodiment of the present invention further includes computer implementable instructions for causing the client device to realize a client-side rearrangement-order information storing process unit configured to cause a storing device of the client device to store rearrangement-order information representing a rule for rearranging the speech element information, and the speech synthesizing unit is configured to rearrange the received speech element information based on the rearrangement-order information stored by the storing device of the client device.

An invention of a speech synthesis method, a server device, a server device program, a client device or a client device program having the aforementioned configuration has similar actions to those of the abovementioned speech synthesis system, and therefore, can achieve the object of the present invention.

Although the present invention has been described above with reference to the respective embodiments, the present invention is not limited by the abovementioned embodiments. The configuration and specification of the present invention can be altered within the scope of the present invention in various manners that can be understood by those skilled in the art.

For example, in modified examples of the respective embodiments, the speech element information storage 21 may be configured to cause the storing device to store first speech element information of low sound quality and second speech element information of higher sound quality than the first speech element information, as speech element information representing one speech element.

For example, the first speech element information is information representing a speech element extracted from speech with a sampling frequency of 8 kHz, and the second speech element information is information representing a speech element extracted from speech with a sampling frequency of 44 kHz. That is to say, the second speech element information is information of higher sound quality than the first speech element information. Moreover, in general, the amount of data (the size of data) of the low-sound-quality speech element information is smaller than that of the high-sound-quality speech element information. The first speech element information may be information with high compression ratio, and the second speech element information may be information with lower compression ratio than the first speech element information.

According to the this modified example, the speech synthesis system is capable of executing a speech synthesis process based on first speech element information of low sound quality in a case that rapid transmission of speech element information and/or reduction of communication load is required, whereas executing a speech synthesis process based on second speech element information of high sound quality in a case that the quality of generated speech information needs to be high. Consequently, it is possible to increase convenience for a user who uses the client device 10.

Further, although speech element identification information is used as a speech element request in the respective embodiments, speech element specification information may be used as a speech element request.

Additionally, speech element identification information is an integer in the respective embodiments, but may be a real number, or may be text. Moreover, in the respective embodiments, an integer represented by speech element identification information is an integer represented by a decimal number, but may be an integer represented by a base-N number (N represents a number other than 10).

Furthermore, in the respective embodiments, speech element information may be information that represents a speech element with a waveform, or may be information that represents a speech element with a parameter (for example, PARCOR (Partial Auto-correlation) Coefficient).

Further, although text information inputted by a user is received in the respective embodiments, previously stored text information may be received, or text information received from another device may be received.

The present invention is applicable to, for example, a speech synthesis system that executes a speech synthesis process by communication between a server device and a client device.

The invention claimed is:

1. A speech synthesis system comprising a server device and a client device connected so as to be capable of communicating with each other, wherein:
   the client device includes:
      a text information accepting unit configured to accept text information representing text; and
      a speech element requesting unit configured to transmit, to the server device, a speech element request for requesting speech element information representing respective speech elements composing speech corresponding to the text represented by the accepted text information;
   the server device includes:
      a speech element information storing unit configured to store speech element information representing respective speech elements included in speech uttered by a speech registering user; and
      a speech element information transmitting unit configured to receive the speech element request transmitted by the client device and, in response to the received speech element request, transmit the speech element information to the client device so that the speech element information is received by the client device in a different order from an order of arrangement of the speech elements in the speech corresponding to the text; and
   the client device further includes a speech synthesizing unit configured to receive the speech element information transmitted by the server device, rearrange the received speech element information so that speech elements represented by the received speech element information are arranged in a same order as the order of arrangement of the speech elements in the speech corresponding to the text, and generate speech information obtained by converting the text into speech based on the rearranged speech element information.

2. The speech synthesis system according to claim 1, wherein:
   the server device includes a server-side rearrangement-order information storing unit configured to store rearrangement-order information representing a rule for rearranging the speech element information;
   the client device includes a client-side rearrangement-order information storing unit configured to store the rearrangement-order information;
   the speech element information transmitting unit is configured to rearrange the speech element information in accordance with a rule represented by the rearrangement-order information stored by the server-side rearrangement-order information storing unit, and transmit the rearranged speech element information to the client device; and
   the speech synthesizing unit is configured to rearrange the received speech element information based on the rearrangement-order information stored by the client-side rearrangement-order information storing unit.

3. The speech synthesis system according to claim 1, wherein the speech element information storing unit is configured to store first speech element information of low sound quality and second speech element information of higher sound quality than the first speech element information, as the speech element information representing one speech element.

4. The speech synthesis system according to claim 1, wherein:
   the speech element information storing unit is configured to store the speech element information and speech element identification information for identifying the speech element information in association with each other;
   the speech element requesting unit is configured to transmit the speech element identification information as the speech element request to the server device; and
   the speech element information transmitting unit is configured to transmit speech element information stored in association with the received speech element identification information.

5. The speech synthesis system according to claim 4, wherein:
   the speech element requesting unit is configured to rearrange the speech element identification information so that the speech element identification information is received by the server device in a different order from the order of arrangement of the speech elements in the speech corresponding to the text, and transmit the rearranged speech element identification information as the speech element request to the server device;
   the speech element information transmitting unit is configured to transmit speech element information stored in association with the received speech element identification information, in an order of reception of the speech element identification information;
   the client device further includes a rearrangement-order information storing unit configured to store rearrangement-order information representing a relation between an order of arrangement of the speech element identification information before the speech element identification information is rearranged and an order of arrangement of the speech element identification information after the speech element identification information is rearranged; and
   the speech synthesizing unit is configured to rearrange the received speech element information based on the stored rearrangement-order information.

6. The speech synthesis system according to claim 5, wherein the speech element requesting unit is configured to rearrange the speech element identification information at random.

7. A speech synthesis method, comprising:
   accepting text information representing text, by a client device;
   transmitting a speech element request for requesting speech element information representing respective speech elements composing speech corresponding to the text represented by the accepted text information, to a server device, by the client device;

receiving the speech element request transmitted by the client device and, in response to the received speech element request, transmitting speech element information, which is information stored in a storing device of the server device and is information representing respective speech elements included in speech uttered by a speech registering user, to the client device so that the speech element information is received by the client device in a different order from an order of arrangement of the speech elements in the speech corresponding to the text, by the server device; and receiving the speech element information transmitted by the server device, rearranging the received speech element information so that speech elements represented by the received speech element information are arranged in a same order as the order of arrangement of the speech elements in the speech corresponding to the text, and generating speech information obtained by converting the text into speech based on the rearranged speech element information, by the client device.

8. The speech synthesis method according to claim 7, comprising:

rearranging the speech element information in accordance with a rule represented by rearrangement-order information, which is information stored in the storing device of the server device and is information representing a rule for rearranging the speech element information, and transmitting the rearranged speech element information to the client device, by the server device; and rearranging the received speech element information based on the rearrangement-order information stored in the storing device of the client device, by the client device.

9. The speech synthesis method according to claim 7, wherein the storing device is configured to store the speech element information and speech element identification information for identifying the speech element information in association with each other, the speech synthesis method comprising:

transmitting the speech element identification information as the speech element request to the server device, by the client device; and transmitting speech element information stored in the storing device in association with the received speech element identification information to the client device, by the server device.

10. The speech synthesis method according to claim 9, comprising:

rearranging the speech element identification information so that the speech element identification information is received by the server device in a different order from the order of arrangement of the speech elements in the speech corresponding to the text, and transmitting the rearranged speech element identification information as the speech element request to the server device, by the client device;

transmitting speech element information stored in association with the received speech element identification information in an order of reception of the speech element identification information, to the client device, by the server device;

causing a storing device of the client device to store rearrangement-order information representing a relation between an order of arrangement of the speech element identification information before the speech element identification information is rearranged and an order of arrangement of the speech element identification information after the speech element identification information is rearranged, by the client device; and rearranging the received speech element information based on the stored rearrangement-order information, by the client device.

11. A server device connected to a client device so as to be capable of communicating therewith, the server device comprising:

a speech element information storing unit configured to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text, a server-side rearrangement-order information storing unit configured to store rearrangement-order information representing a rule for rearranging the speech element information, wherein the speech element information transmitting unit is configured to rearrange the speech element information in accordance with a rule represented by the rearrangement-order information stored by the server-side rearrangement-order information storing unit, and transmit the rearranged speech element information to the client device.

12. A non-transitory computer-readable medium storing a server device program comprising computer implementable instructions for causing a server device connected to a client device so as to be capable of communicating therewith, to realize:

a speech element information storing process unit configured to cause a storing device of the server device to store speech element information representing respective speech elements included in speech uttered by a speech registering user; and a speech element information transmitting unit configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text, further comprising a computer implementable instruction for causing the server device to realize a server-side rearrangement-order information storing process unit configured to cause the storing device of the server device to store rearrangement-order information representing a rule for rearranging the speech element information, wherein the speech element information transmitting unit is configured to rearrange the speech element information in accordance with a rule represented by the rearrangement-order information stored in the storing device of the server device, and transmit the rearranged speech element information to the client device.

13. A client device connected to a server device so as to be capable of communicating therewith, the client device comprising:
a text information accepting unit configured to accept text information represented by text;
a speech element requesting unit configured to transmit, to the server device, a speech element request for requesting speech element information representing respective speech elements composing speech corresponding to the text represented by the accepted text information and is configured to transmit, to the server device, speech element identification information for identifying the speech element information, as the speech element request and is configured to rearrange the speech element identification information so that the speech element identification information is received by the server device in a different order from the order of arrangement of the speech elements in the speech corresponding to the text, and transmit the rearranged speech element identification information as the speech element request to the server device; and
a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information; and
a rearrangement-order information storing unit configured to store rearrangement-order information representing a relation between an order of arrangement of the speech element identification information before the speech element identification information is rearranged and an order of arrangement of the speech element identification information after the speech element identification information is rearranged, wherein the speech synthesizing unit is configured to rearrange the received speech element information based on the stored rearrangement-order information.

14. A client device connected to a server device so as to be capable of communicating therewith, the client device comprising:
a text information accepting unit configured to accept text information represented by text;
a speech element requesting unit configured to transmit, to the server device, a speech element request for requesting speech element information representing respective speech elements composing speech corresponding to the text represented by the accepted text information; and
a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information; and
a client-side rearrangement-order information storing unit configured to store rearrangement-order information representing a rule for rearranging the speech element information, wherein the speech synthesizing unit is configured to rearrange the received speech element information based on the rearrangement-order information stored by the client-side rearrangement-order information storing unit.

15. A non-transitory computer-readable medium storing a client device program comprising computer implementable instructions for causing a client device connected to a server device so as to be capable of communicating therewith, to realize:
a text information accepting unit configured to accept text information representing text;
a speech element requesting unit configured to transmit, to the server device, a speech element request for requesting speech element information representing respective speech elements composing speech corresponding to the text represented by the accepted text information and is configured to transmit, to the server device, speech element identification information for identifying the speech element information, as the speech element reques and is configured to rearrange the speech element identification information so that the speech element identification information is received by the server device in a different order from the order of arrangement of the speech elements in the speech corresponding to the text, and transmit the rearranged speech element identification information as the speech element request to the server device; and
a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information,
the client device program product further comprising computer implementable instructions for causing the client device to realize a rearrangement-order information storing process unit configured to cause a storing device of the client device to store rearrangement-order information representing a relation between an order of arrangement of the speech element identification information before the speech element identification information is rearranged and an order of arrangement of the speech element identification information after the speech element identification information is rearranged, wherein the speech synthesizing unit is configured to rearrange the received speech element information based on the rearrangement-order information stored in the storing device of the client device.

16. A non-transitory computer-readable medium storing a client device program comprising computer implementable instructions for causing a client device connected to a server device so as to be capable of communicating therewith, to realize:
a text information accepting unit configured to accept text information representing text;
a speech element requesting unit configured to transmit, to the server device, a speech element request for requesting speech element information representing respective speech elements composing speech corresponding to the text represented by the accepted text information; and a speech synthesizing unit configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information, the client device program further comprising computer implementable instructions for causing the client device to realize a client-side rearrangement-order information storing process unit configured to cause a storing device of the client device to store rearrangement-order information representing a rule for rearranging the speech element information, wherein the speech synthesizing unit is configured to rearrange the received speech element information based on the rearrangement-order information stored by the storing device of the client device.

17. A speech synthesis system comprising a server device and a client device connected so as to be capable of communicating with each other, wherein:

the client device includes:
  a text information accepting means configured to accept text information representing text; and
  a speech element requesting means configured to transmit, to the server device, a speech element request for requesting speech element information representing respective speech elements composing speech corresponding to the text represented by the accepted text information;

the server device includes:
  a speech element information storing means configured to store speech element information representing respective speech elements included in speech uttered by a speech registering user; and
  a speech element information transmitting means configured to receive the speech element request transmitted by the client device and, in response to the received speech element request, transmit the speech element information to the client device so that the speech element information is received by the client device in a different order from an order of arrangement of the speech elements in the speech corresponding to the text; and the client device further includes a speech synthesizing means configured to receive the speech element information transmitted by the server device, rearrange the received speech element information so that speech elements represented by the received speech element information are arranged in a same order as the order of arrangement of the speech elements in the speech corresponding to the text, and generate speech information obtained by converting the text into speech based on the rearranged speech element information.

18. A server device connected to a client device so as to be capable of communicating therewith, the server device comprising:

a speech element information storing means configured to store speech element information representing respective speech elements included in speech uttered by a speech registering user;

a speech element information transmitting means configured to receive, from the client device, a speech element request for requesting speech element information representing respective speech elements composing speech corresponding to text represented by text information accepted by the client device and, in response to the received speech element request, transmit the speech element information to the client device so that the speech element information is received by the client device in a different order from an order of arrangement of the speech elements in the speech corresponding to the text; and a server-side rearrangement-order information storing unit configured to store rearrangement-order information representing a rule for rearranging the speech element information, wherein the speech element information transmitting unit is configured to rearrange the speech element information in accordance with a rule represented by the rearrangement-order information stored by the server-side rearrangement-order information storing unit, and transmit the rearranged speech element information to the client device.

19. A client device connected to a server device so as to be capable of communicating therewith, the client device comprising:

a text information accepting means configured to accept text information represented by text;

a speech element requesting means configured to transmit, to the server device, a speech element request for requesting speech element information representing respective speech elements composing speech corresponding to the text represented by the accepted text information for identifying the speech element information, as the speech element request and is configured to rearrange the speech element identification information so that the speech element identification information is received by the server device in a different order from the order of arrangement of the speech elements in the speech corresponding to the text, and transmit the rearranged speech element identification information as the speech element request to the server device;

a speech synthesizing means configured to receive speech element information transmitted by the server device, rearrange the received speech element information so that speech elements represented by the received speech element information are arranged in a same order as an order of arrangement of the speech elements in the speech corresponding to the text, and generate speech information obtained by converting the text into speech based on the rearranged speech element information; and a rearrangement-order information storing unit configured to store rearrangement-order information representing a relation between an order of arrangement of the speech element identification information before the speech element identification information is rearranged and an order of arrangement of the speech element identification information after the speech element identification information is rearranged, wherein the speech synthesizing unit is configured to rearrange the received speech element information based on the stored rearrangement-order information.

* * * * *